United States Patent
Marr et al.

(10) Patent No.: US 9,684,630 B1
(45) Date of Patent: Jun. 20, 2017

(54) PROVISIONING OF CRYPTOGRAPHIC MODULES

(71) Applicant: Amazon Technologies, Inc., Reno, NV (US)

(72) Inventors: Michael David Marr, Monroe, WA (US); Nachiketh Rao Potlapally, Arlington, VA (US); Matthew David Klein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 670 days.

(21) Appl. No.: 13/706,024

(22) Filed: Dec. 5, 2012

(51) Int. Cl.
G06F 13/00 (2006.01)
G06F 15/177 (2006.01)
G06F 9/455 (2006.01)
H04L 29/06 (2006.01)

(52) U.S. Cl.
CPC ........ G06F 15/177 (2013.01); G06F 9/45533 (2013.01); H04L 63/08 (2013.01)

(58) Field of Classification Search
CPC .... H04L 9/3234; H04L 63/0428; G06F 21/57
See application file for complete search history.

(56) References Cited

U.S. PATENT DOCUMENTS

| | | | |
|---|---|---|---|
| 6,178,511 B1 * | 1/2001 | Cohen | G06F 21/335 726/6 |
| 7,900,058 B2 * | 3/2011 | Mabayoje | G06F 21/31 455/411 |
| 8,214,880 B1 * | 7/2012 | Wu | H04L 63/0876 379/15.03 |
| 2003/0149974 A1 * | 8/2003 | Diehl | H04N 1/32128 725/25 |
| 2005/0149924 A1 * | 7/2005 | Komarla | G06F 9/4416 717/176 |
| 2006/0026423 A1 * | 2/2006 | Bangerter | H04L 9/3218 713/164 |
| 2006/0137022 A1 * | 6/2006 | Kilian-Kehr | G06F 21/10 726/27 |
| 2007/0079120 A1 * | 4/2007 | Bade | G06F 21/57 713/166 |
| 2008/0228901 A1 * | 9/2008 | Choi | H04L 41/0803 709/220 |
| 2008/0235372 A1 * | 9/2008 | Sailer | G06F 21/577 709/224 |
| 2009/0064292 A1 * | 3/2009 | Carter | G06F 21/57 726/5 |
| 2009/0070598 A1 * | 3/2009 | Cromer | G06F 21/575 713/193 |
| 2009/0199132 A1 * | 8/2009 | Chong | G06F 9/4401 715/810 |

(Continued)

*Primary Examiner* — Trang Doan
(74) *Attorney, Agent, or Firm* — Thomas|Horstemeyer, LLP (57) ABSTRACT

Disclosed are various embodiments of a first computing device for obtaining an authentication credential for a cryptographic module of a second computing device. The authentication credential is obtained via a communication session with a module interface of the second computing device. Configuration data is determined for the cryptographic module based at least in part upon the authentication credential. The configuration data is transmitted to the second computing device via the communication session.

24 Claims, 7 Drawing Sheets

(56) References Cited

U.S. PATENT DOCUMENTS

| | | | |
|---|---|---|---|
| 2010/0077066 A1* | 3/2010 | Chawla | G06F 9/4416 709/222 |
| 2011/0040731 A1* | 2/2011 | Gavade | G06F 17/30053 707/684 |
| 2011/0131418 A1* | 6/2011 | Teng | G06F 21/57 713/185 |
| 2012/0066696 A1* | 3/2012 | Dasgupta | G06F 15/7807 719/328 |
| 2012/0117348 A1* | 5/2012 | Triantafillou | G06F 21/566 711/163 |
| 2012/0182989 A1* | 7/2012 | Hernandez | H04L 49/351 370/389 |
| 2012/0311570 A1* | 12/2012 | Gandhi | G06F 9/5027 718/1 |
| 2013/0227558 A1* | 8/2013 | Du | G06F 9/45558 718/1 |
| 2014/0006776 A1* | 1/2014 | Scott-Nash | G06F 21/57 713/156 |
| 2014/0007087 A1* | 1/2014 | Scott-Nash | G06F 21/53 718/1 |
| 2014/0064056 A1* | 3/2014 | Sakata | H04L 41/00 370/216 |
| 2014/0122674 A1* | 5/2014 | Gray | H04L 41/0846 709/222 |

\* cited by examiner

PROVISIONING OF CRYPTOGRAPHIC MODULES

BACKGROUND

In an age of information and ubiquitous computing, computing equipment organized in data centers is often used to deliver the services and information relied upon. The data centers may receive numerous equipment racks installed and pre-configured with various servers, network switches, network routers, and/or other types of computing devices. Automating the configuration of the computing devices may provide a significant cost savings.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

This disclosure describes various embodiments for provisioning cryptographic modules of one or more computing devices, such as may be present in racks of computing devices. For example, data centers may receive equipment racks installed and pre-configured with various servers, network switches, network routers, and/or other types of computing devices. The computing devices within the racks may be ordered in a configuration that includes a cryptographic module, such as a Trusted Platform Module (TPM), Hardware Security Module (HSM) or other hardware or software configuration that provides similar functionality.

Technicians in such data centers may use a handheld configuration device or other type of computing device, portable or otherwise, in order to provision the cryptographic modules. A technician may connect the configuration device to a network or communication bus of each computing device for which a cryptographic module should be provisioned. The configuration device may establish a secure communication session with the computing device in order to authenticate the computing device and/or cryptographic module. If the authentication is successful, the cryptographic module may be provisioned with credentials and/or a configuration specified by provisioning data obtained by the configuration device.

Figure 1:
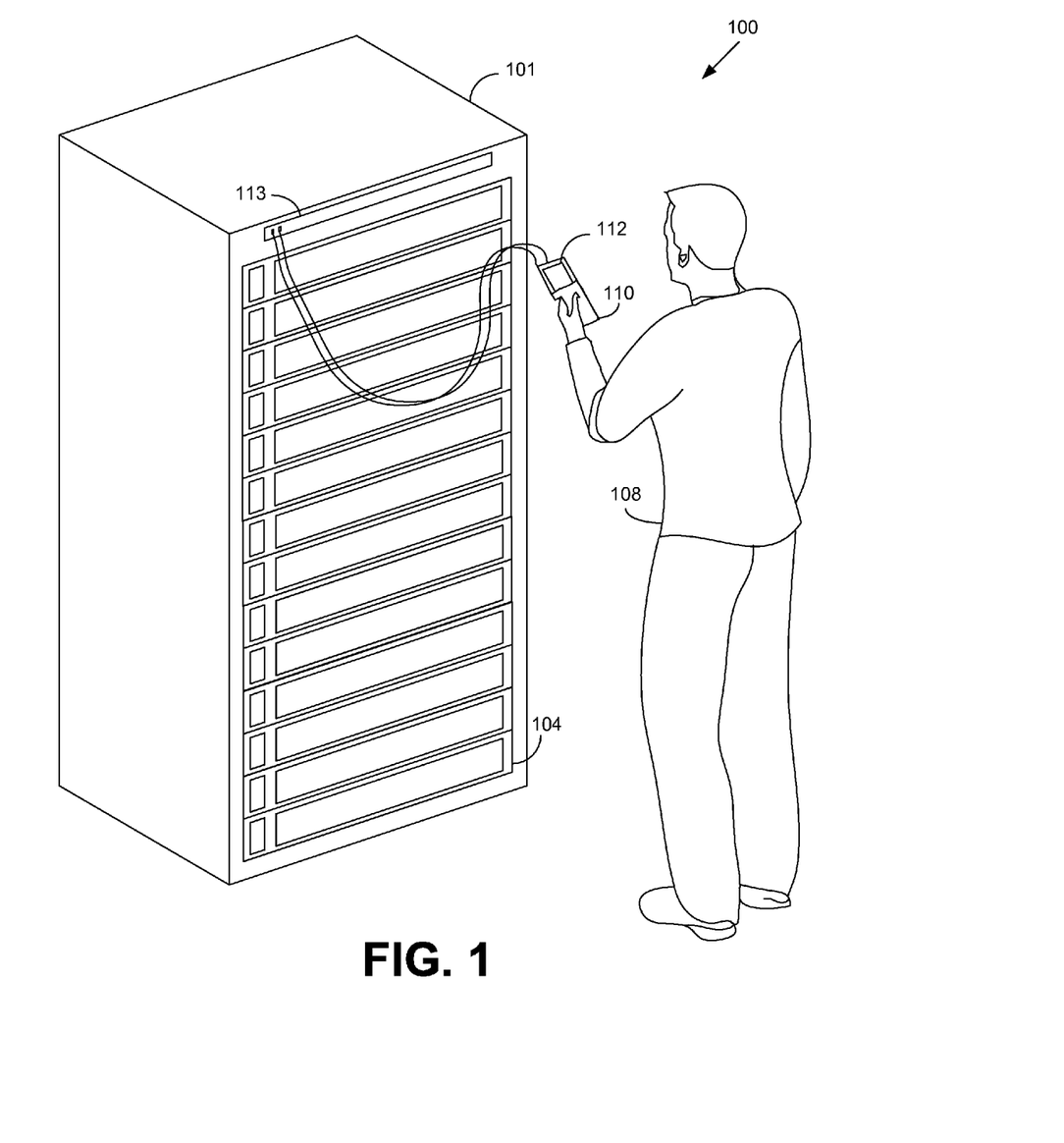
FIG. 1 is a drawing illustrating a data center environment in which technicians provision cryptographic modules of components arranged in component assemblies.

FIG. 1 shows an example environment 100 in which these techniques may be implemented. The example environment 100 may comprise a data center or other physical installation in which multiple computer equipment, resources, assemblies, and/or components are received and installed on an ongoing basis. A physical installation such as this may house multiple components or resources, such as computers, telecommunications devices, networking components, power supplies, cooling equipment, and so forth. The equipment may be housed in rows or grids of similar or identical equipment racks, and the equipment racks themselves may be considered to be resources. The data center may be housed in a room, a building, a compound that includes multiple buildings, modular container unit or other environment used for housing computing equipment.

The example of FIG. 1 shows a single equipment rack 101 as an example of a component assembly or housing that may be used in a data center. The equipment rack 101 may contain multiple individual components 104 and/or other sub-components. The components 104 may be interconnected and connected to the equipment rack 101 using various cables in order to support network connectivity, console connectivity, electrical power, and/or other services. Both the equipment rack 101 and its components 104 may be visually and/or electronically labeled with various identifiers.

The data center may be staffed by one or more technicians 108, or other support personnel. The technicians 108 may use a handheld or other computing device 110 to assist in performing various diagnostic, informational, and administrative tasks. The computing device 110 may be a general-purpose device, such as a laptop computer, personal digital assistant (PDA), tablet computer, slate computer, smartphone, or a non-portable computing device (for example, a workstation or purpose-built stationary appliance located near the data center loading dock) upon which applications may be installed and executed. The computing device 110 may comprise a display 112, a printer, and/or other type of interface device for communicating with the technicians 108.

The computing device 110 may be capable of provisioning cryptographic modules of various components 104 through the use of one or more interfaces for a network 113. In some embodiments, the network 113 may be partitioned into distinct networks serving different roles, such as for operational data communications and management of the component 104. In some embodiments, the computing device 110 may be capable of executing a web browser or other client application, and may communicate wirelessly with various network-accessible resources and management components.

FIG. 1 is intended to depict a scenario in which the equipment rack 101 has been physically delivered to a data center and is in the receiving process, prior to installation within the data center. Various portions of the components 104 may be configured by the computing device 110 while the equipment rack 101 is within the receiving process or at a later time such as after installation of the equipment rack 101 in the data center. In the following discussion, a general description of the system and its components is provided, followed by a discussion of the operation of the same.

Figure 2A:
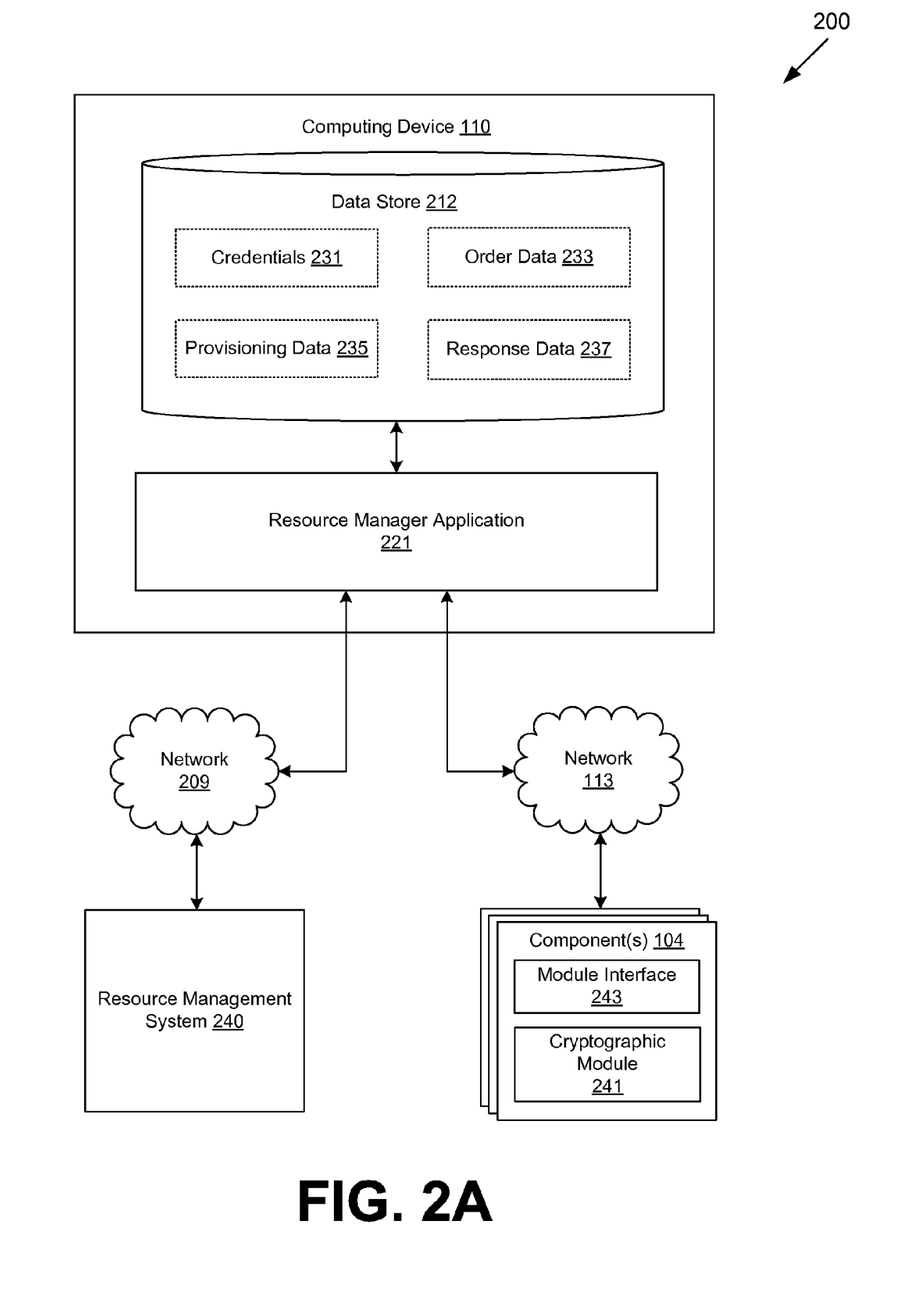
FIGS. 2A and 2B are drawings of a networked environment according to various embodiments of the present disclosure.

Referring next to FIG. 2A, shown is a networked environment 200 according to various embodiments. The networked environment 200 includes a computing device 110 in data communication via a network 113 (FIG. 1). The network 113 includes, for example, local area networks (LANs), wired networks, wireless networks, or other suitable networks, etc., or any combination of two or more such networks. The network 113 may be a "private" network that is physically or logically isolated from other networks and network devices not associated with the task of provisioning cryptographic modules. In alternate embodiments, the computing device 110 may communicate with the component 104 via a baseboard management controller (BMC), serial console, radio-frequency identification (RFID), Peripheral Component Interconnect Express (PCIe) interface, and/or communication bus (e.g. universal serial bus (USB), Thunderbolt™ interface, etc.) instead of the network 113.

In some embodiments, the computing device 110 may further be in data communication via a network 209. The network 209 includes, for example, the Internet, intranets, extranets, wide area networks (WANs), local area networks (LANs), wired networks, wireless networks, or other suitable networks, etc., or any combination of two or more such networks. In these embodiments, the computing device 110 may forward data between one or more components 104 and the network 209. The computing device 110 may further include a data and/or packet filtering, encapsulation, integrity checking, encryption or other cryptographic capability in order to ensure the data forwarded is in furtherance of provisioning cryptographic modules.

The computing device 110 may comprise, for example, a processor-based system such as a computer system. Such a computer system may be embodied in the form of a laptop computer, PDA, tablet computer, slate computer, smartphone, or other devices with like capability. The display 112 (FIG. 1) may comprise, for example, one or more devices such as liquid crystal display (LCD) displays, gas plasma-based flat panel displays, organic light emitting diode (OLED) displays, LCD projectors, or other types of display devices, etc. The display 112 may be integrated into a common housing with the computing device 110, or may be a separate device such as a workstation display. Likewise, a printing mechanism may be included in the computing device 110 as an integrated component, or as a separate device.

Various applications and/or other functionality may be executed in the computing device 110 according to various embodiments. Also, various data is stored in a data store 212 that is accessible to the computing device 110. The data store 212 may be representative of a plurality of data stores 212 as can be appreciated. The data stored in the data store 212, for example, is associated with the operation of the various applications and/or functional entities described below. In some embodiments, a portion of the data store 212 may function as a cache or other auxiliary storage for another data store remote to the computing device 110.

The components executed on the computing device 110, for example, include a resource manager application 221, and other applications, services, processes, systems, engines, or functionality not discussed in detail herein. The resource manager application 221 is executed to facilitate provisioning and configuration of the cryptographic modules of the one or more components 104, which may be organized within a component assembly such as the equipment rack 101 (FIG. 1). In some embodiments, the resource manager application 221 may be executed within a virtual machine, the virtual machine being executable by one or more processors of the computing device 110.

The data stored in the data store 212 includes, for example, credentials 231, order data 233, provisioning data 235, response data 237, and potentially other data. In some embodiments, the data stored in the data store 212 may represent a portion of the respective credentials 231, order data 233, provisioning data 235, response data 237, and potentially other data available through a resource management system 240. In various embodiments, portions of the data from the resource management system 240 may be stored in the data store 212 on a space available, "on-demand," "as-needed," and/or other basis as can be appreciated. Furthermore, communications between the computing device 110 and resource management 240 may be authenticated and/or encrypted using secure socket layer/transport layer security (SSL/TLS), hypertext transfer protocol secure (HTTPS), server message block (SMB), network file system (NFS), and/or other possible data communication and/or cryptographic protocols.

The credentials 231 may include one or more credentials to be applied to cryptographic modules of various components 104, as well as credentials used to authenticate and/or secure communications between the computing device 110 and the components 104. As a non-limiting example, the credentials 231 may include shared keys, public/private key pairs, digital certificates, roots of trust, TPM migration keys, and/or other credentials as can be appreciated.

The order data 233 may indicate specific components 104 and/or component assemblies, such as equipment racks 101 that are expected to be received, as well as characteristics of the expected equipment. Such characteristics may include specifications, identifications, and/or various other configuration data associated with the components 104 that are expected to be included in the component assemblies. As a non-limiting example, the order data 233 may comprise asset identifiers, serial numbers, MAC addresses, computing hardware resources installed, and/or other configuration data (e.g., firmware revisions or settings) associated with the components 104 and component assembly.

The provisioning data 235 may include the various actions to be performed in response to the components 104 that are discovered and/or obtained by the resource manager application 221. As a non-limiting example, the provisioning data 235 may comprise identifiers for cryptographic modules of the components 104, asset identifiers, serial numbers, credentials 231 to be applied to the cryptographic modules, and/or other configuration data associated with the cryptographic modules of the components 104. The response data 237 may include a log of the discrepancies in the configuration data for the components 104 and a responsive action to be taken for the component 104 and/or the associated component assembly. The discrepancies may arise from differences between the expected configuration provided in the order data 233 and the empirical or "actual" observed configuration.

The component 104 is representative of one or more computing devices that may comprise, for example, a server computer, desktop computer, laptop computer, a network router, a network switch, and/or any other system providing computing capability. Within the environment 100, one or more of the components 104 may be configured and arranged in a component assembly such as an equipment rack 101. Each of the components 104 may comprise a cryptographic module 241 that may include a cryptoprocessor circuit and a memory configured to store credentials 231 and other associated cryptographic materials. The cryptographic module 241 may be a trusted platform module (TPM), a hardware security module (HSM), or other type of cryptographic module as can be appreciated. The cryptographic module 241 may be used to perform authentication, integrity validation, encryption, decryption, and/or other possible cryptographic operations and services. In other embodiments, the cryptographic module 241 may be implemented as a software module executable by a processor of the component 104.

In at least one embodiment, the cryptographic module 241 may be accessible via a module interface 243. The module interface 243 may provide an interface for communicating with the cryptographic module 241 and other sub-components of the component 104. The module interface 243 may be implemented as an extensible firmware interface (EFI), unified EFI (UEFI), basic input/output system (BIOS), pre-boot execution environment (PXE), operating system with a driver for the cryptographic module 241, and/or other logic executable by a processor or other circuit of the component 104. The module interface 243 may facilitate communication with the cryptographic module 241, where the communication occurs via the network 113 and/or through a programmatic interface accessible locally in the component 104. The component 104 may be configured to execute an operating system and various applications such as, for example, diagnostic and/or test script applications, browsers, mobile applications, email applications, social networking applications, and/or other applications.

Next, a general description of the operation of the various components of the networked environment 200 is provided. To begin, one or more components 104 have been installed within a component assembly such as an equipment rack 101. Details of the installation of the components 104 within the component assembly may be specified within the order data 233. The order data 233 may comprise identifiers for specific component assemblies, such as equipment racks 101 that are expected to be received, as well as characteristics of the expected component assemblies. Such characteristics may include specifications, identifications, and/or various other configuration data associated with the components 104 that are expected to be included in the component assemblies.

As a non-limiting example, the order data 233 may specify that equipment rack with an identifier of 15A12345 should comprise a model SX server having serial number S09876. Given a component assembly, order data 233, and provisioning data 235, the resource manager application 221 may begin provisioning the cryptographic modules 241 of the components 104 within the component assembly. In other embodiments, instead of providing identifiers for a component assembly or an entire order, an operator may enter identifying information for a particular component 104, such as an asset identifier or a serial number. Continuing the previous example, the provisioning data 235 may then specify that a cryptographic module 241 associated with a component 104 having the serial number S09876 should have various credentials 231 applied. The characteristics and specifications associated with the particular component 104 may then be located within the order data 233 and/or provisioning data 235.

In order to provision the cryptographic module 241, the computing device 110 may establish a secure communication session with the module interface 243 via the network 113 or a communication bus. In some embodiments, the module interface 243 may supply one or more session credentials with which the computing device 110 may authenticate the module interface 243 using the credentials 231. The session credentials supplied by the cryptographic device may include a digital certificate, a shared secret key, and/or other possible credentials as can be appreciated. In addition to authentication, the session credentials may be used to facilitate encryption of the communication session, thereby ensuring confidentiality of the data as it is exchanged between the module interface 243 and the computing device 110.

As described previously, the module interface 243 may be accessible to the computing device 110 via the network 113 and/or a communication bus. For a module interface 243 accessible over the network 113, establishing a secure communication session may occur as part of secure socket layer/transport layer security (SSL/TLS), intelligent platform management interface (IPMI), simple network management protocol (SNMP), secure shell (SSH), and/or other data communication protocols. Furthermore, in some embodiments, the computing device 110 may also provide one or more session credentials of the credentials 231 with which the module interface 243 may authenticate the computing device 110, therein providing mutual authentication.

For communications occurring via a local communication bus instead of the network 113, a secure communication session may be established using similar techniques as applied in the context of the network 113. Alternatively, the secure communication session may be based on the inherent authentication and confidentiality provided by the physical presence of the computing device 110 on a local communications bus of the component 104. For example, the component 104 may have a dedicated external port that has exclusive access to the local communications bus.

Upon establishing a secure communication session with the module interface 243, the resource manager application 221 may query and/or configure the cryptographic module 241. The configuration and/or credentials 231 to be applied to the cryptographic module 241 may be specified by the provisioning data 235. For example, the provisioning data 235 may specify that a cryptographic module 241, such as a TPM, should be enabled for all components 104. Furthermore, the provisioning data 235 may specify that ownership should be taken of the TPM. The act of taking ownership of the TPM may require supplying a password or other credentials 231 that may be specified by the provisioning data 235. Other passwords or credentials, such as an administrative password for the System BIOS of component 104, may be similarly supplied as can be appreciated.

As another example, the provisioning data 235 may specify that for the cryptographic module 241 having a unique module identifier, such as a TPM endorsement key, one or more credentials 231 should be stored in the cryptographic module 241. The specific credentials 231 that are stored may be a digital certificate for a certificate authority, a password or symmetric key, various possible credentials for users, credentials for establishing secure communication sessions with remote devices, and/or other possible uses.

As a further example, the provisioning data 235 may specify that a cryptographic module 241 for a component having an asset identifier of X12345 should be configured to enable various services offered by the cryptographic module 241. As a non-limiting example, the services may include encryption, authentication, integrity validation, remote attestation, direct anonymous attestation, and/or other possible services.

For each component 104 specified, either individually or as part of an order or component assembly, the resource manager application 221 may initiate provisioning of the respective cryptographic module 241. Any discrepancy between the actual configuration of the cryptographic module 241 for a component 104 and the configuration of the cryptographic module 241 specified by the provisioning data 235 and/or order data 233 for the component 104 may be logged in the response data 237.

For example, an order in the order data 233 may specify a component 104 by a unique asset identifier of AI1234. The provisioning data 235 may specify that a component 104 having the asset identifier AI1234 and a permanent module identifier of MI5678 for the cryptographic module 241, should have a digital certificate from the credentials 231 installed in the cryptographic module 241. Continuing the example, if a discrepancy exists between the asset identifier and module identifier specified by the provision data 235, the discrepancy may be logged to the response data 237. The resource manager application 221 may continue to provision the cryptographic modules 241 of each of the components 104 until all of the expected components 104 have been provisioned, until a timeout occurs, or other possible events.

Based upon the response data 237 generated, the resource manager 221 may determine a response for the component assembly and/or each individual component 104 based upon discrepancies identified. As a non-limiting example, an incorrect version of firmware in a component 104 may be remediated locally, while a component 104 having a non-functioning TPM may instead be returned to the vendor. In some embodiments, the response data 237 may further comprise one or more discrepancy thresholds for each component 104 and/or for the component assembly.

For example, if a discrepancy is discovered with one of a plurality of components 104 of a component assembly, a discrepancy threshold may indicate that the responsive action should be to accept delivery and perform on-site remediation of the problem. However, if discrepancies exist for half of the components 104 of a component assembly, the discrepancy threshold may indicate that the responsive action should be to reject delivery. In general, the discrepancy threshold can be used to determine an acceptable rate of defects. In other embodiments, there may be a plurality of discrepancy thresholds for different types of components, and accept or reject decisions may be made based on a combination of constraints as appreciated by those of ordinary skill in the art.

In some embodiments, the computing device 110 may indicate the response via the display 112 (FIG. 1) and may permit a user to perform other actions such as provide comments, override the response, see more detailed information, etc. In other embodiments, the computing device may print all or a portion of the response for a user. For example, if a component assembly is refused for shipment, a printed response may be provided to the supplier detailing the reasons for refusal.

Figure 2B:
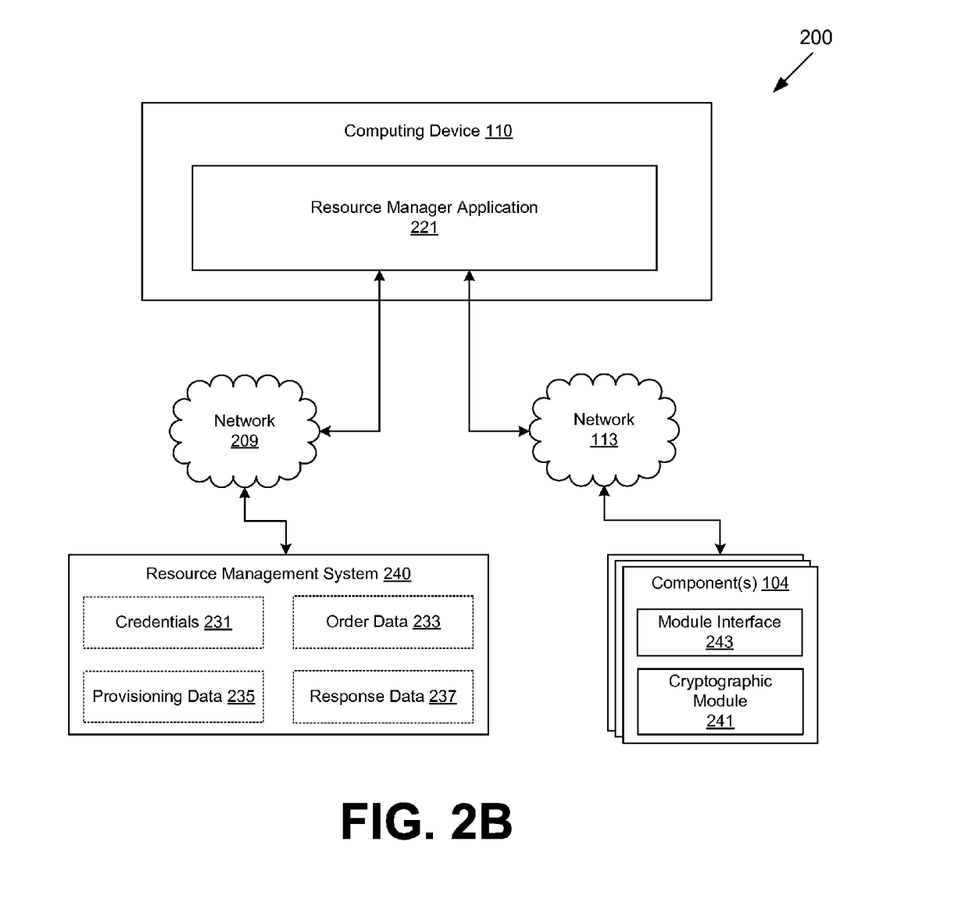

Turning now to FIG. 2B, shown are other embodiments of the networked environment 200. In these embodiments, the credentials 231, order data 233, provisioning data 235, response data 237, and/or other data of the data store 212 (FIG. 2A) may be stored in the resource management system 240. The operations of provisioning the cryptographic modules 241 of various components 104 previously described in association with the resource manager application 221 of FIG. 2A may be performed by the resource management system 240. As a non-limiting example, the operations may include taking ownership of a cryptographic module 241, applying credentials 231 to the cryptographic modules 241, configuring services of the cryptographic modules 241, and/or other operations described previously.

In these embodiments, the resource manager application 221 executing in the computing device 110 may render a user interface for the resource management system 240 and/or other computing devices accessible via the network 209. To this end, the resource manager application 221 may be a browser and/or other application capable of rendering a user interface in the computing device 110. Furthermore, the resource manager application 221 may facilitate the operations between the resource management system 240 and the components 104 by forwarding the data to be exchanged between them across the respective communication mediums.

Figure 3:
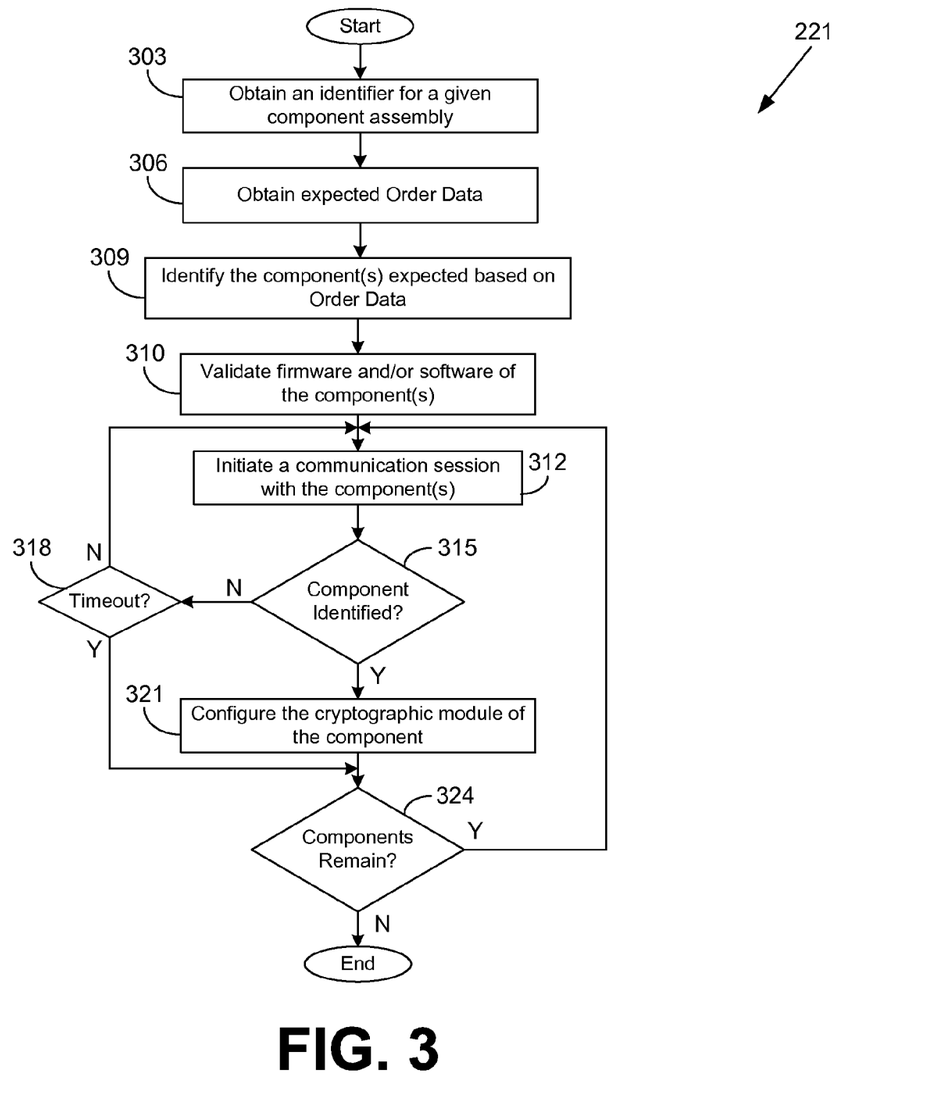
FIG. 3 is a flowchart illustrating one example of functionality implemented as portions of a resource manager application executed in a computing device in the networked environment of FIGS. 2A and 2B according to various embodiments of the present disclosure.

Referring next to FIG. 3, shown is a flowchart that provides one example of the operation of a portion of the resource manager application 221 according to various embodiments. It is understood that the flowchart of FIG. 3 provides merely an example of the many different types of functional arrangements that may be employed to implement the operation of the portion of the resource manager application 221 as described herein. As an alternative, the flowchart of FIG. 3 may be viewed as depicting an example of steps of a method implemented in the computing device 110 (FIG. 1) according to one or more embodiments.

This portion of the resource manager application 221 may be initiated based upon obtaining a component assembly for provisioning of the cryptographic modules 241 (FIG. 2A) of the constituent components 104 (FIG. 1). Beginning with block 303, the resource manager application 221 may obtain an identifier for the particular component assembly to be provisioned. The component assembly may be identified by entry of an identifier by a user, scanning a bar code, scanning a radio frequency identification (RFID) tag, and/or other possible techniques.

Next, in block 306, the resource manager application 221 may obtain the order data 233 (FIG. 2A) comprising data associated with the component assembly and components 104 to be provisioned. As described previously, the order data 233 may be obtained from, for example, the local data store 212 (FIG. 2A) and/or from the resource management system 240 (FIG. 2A). The order data 233 may comprise specifications, identifications, and/or various other configuration data associated with the component assemblies and components 104 that are expected to be included in the component assemblies.

Then, in block 309, the resource manager application 221 may identify the portion of the components 104 of the order data 233 to be provisioned based upon a correlation with the provisioning data 235. Moving on, in block 310, the resource manager application 221 may validate the firmware and/or software of the components 104 to be provisioned. In some embodiments, if the firmware and/or software is not the correct version, the resource manager application 221 may initiate an update to the proper version. In alternative embodiments, the resource manager application 221 may initiate a replacement of firmware and/or software of the components 104 regardless of the version presently installed.

Continuing, in block 312, the resource manager application 221 may initiate a communication session with the module interface 243 (FIG. 2A) of the next component 104 identified for provisioning. As described previously, in some embodiments, the resource manager application 221 may further authenticate the cryptographic module 241 (FIG. 2A) beyond any authentication performed for establishing the communication session with the module interface 243. Next, in block 315, the resource manager application 221 determines if the component 104 with which the communication session is established is the component 104 and/or cryptographic module 241 specified by the provision data 235 (FIG. 2A). If not, in block 318 the resource manager application 221 determines if a timeout has occurred waiting for the next component identification. If a timeout has not occurred, execution returns to block 312, and may store any discrepancy identified within the response data 237 (FIG. 2A). Alternatively, if a timeout has occurred, execution of the resource manager application 221 proceeds to block 324.

Returning to block 315, if the resource manager application 221 has successfully authenticated the component 104 and/or cryptographic module 241, then, in block 321, the cryptographic module 241 may be provisioned according to the provisioning data 235. Next, in block 324, the resource manager application 221 determines whether any further components 104 remain to be provisioned for the given component assembly. If additional components 104 remain, execution of the resource manager application 221 returns to block 312. Alternatively, if no further component 104 remains for which the cryptographic module 241 is to be provisioned, this portion of the execution of the resource manager application ends as shown.

FIGS. 4-7 illustrate examples of instructing the technician 108 (FIG. 1) in the context described above. Actual embodiments of the resource manager application 221 (FIG. 2A) executing in the computing device 110 (FIG. 1) may provide varying levels of instruction specificity or granularity, at various different points in the validation process. Furthermore, while these figures illustrate the instructions being output on a display 112 of the computing device 110, in other instances some or all of the instructions may additionally or alternatively be output audibly through a speaker and/or tangibly on a printed page.

Figure 4:
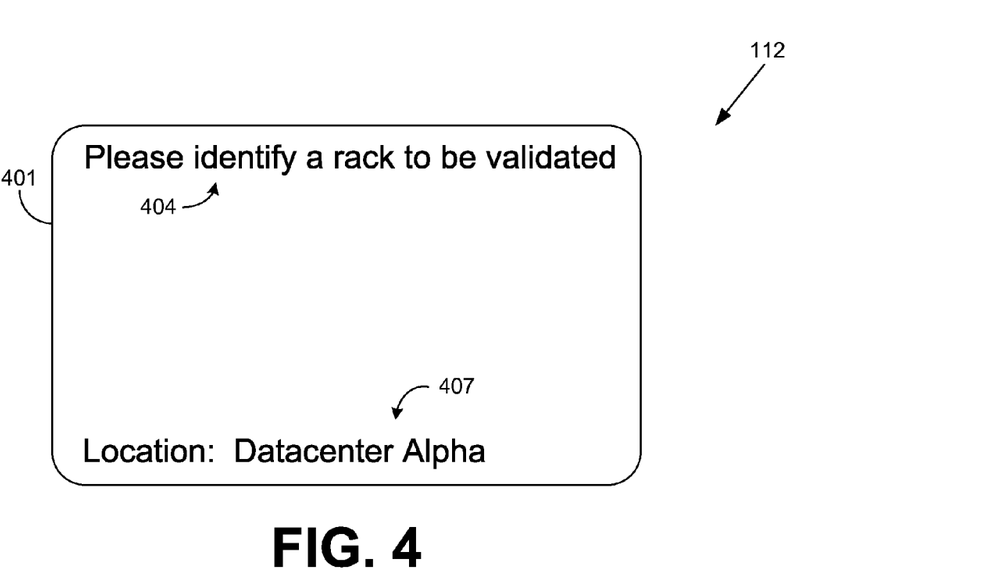
FIGS. 4-7 are drawings of example user interfaces rendered by a computing device in the networked environment of FIGS. 2A and 2B according to various embodiments of the present disclosure.

FIG. 4 shows an example instruction pane 401 that may be displayed to a technician or other support personnel in order to initiate the provisioning operation. In the described embodiment, the instruction pane 401 may be presented on a display 112 of the computing device 110.

The instruction pane 401 may contain an instruction 404, directing the technician to identify a component assembly to be provisioned. The instruction pane 401 may also contain a location indicator 407, showing the current location of the technician, which in this example is shown as "Datacenter Alpha."

Figure 5:
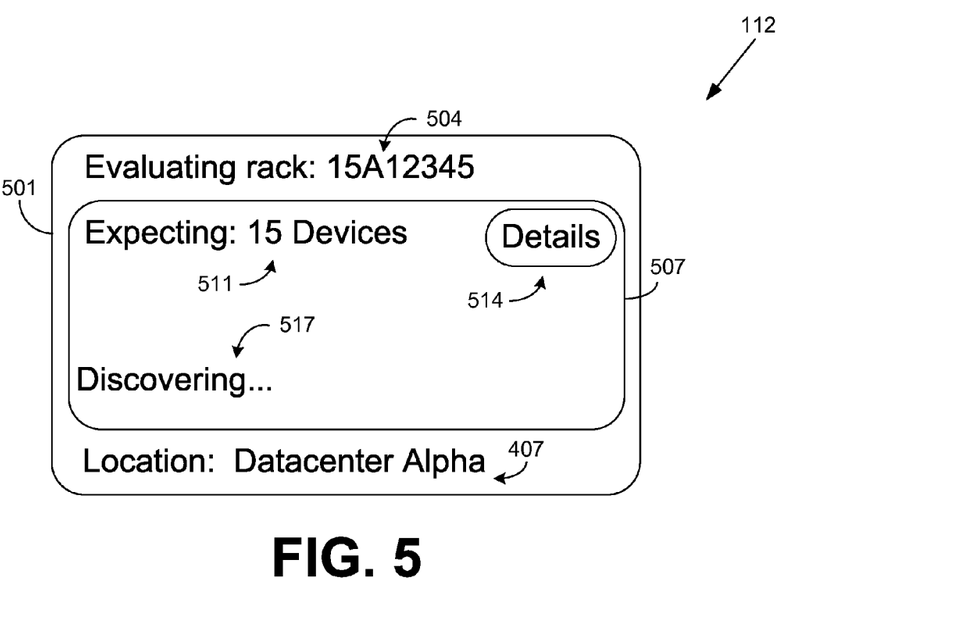

FIG. 5 shows an example instruction pane 501 that might be used after a technician has scanned or identified a particular equipment rack, and has started provisioning the cryptographic modules 241 (FIG. 2A) of the components 104 (FIG. 1) of the component assembly. The instruction pane 501 may include a status area 504, indicating the current component assembly being validated. In this example, the status area 504 indicates that the technician 108 is in the process of validating an equipment rack having the identifier "15AI2345." The instruction pane 501 may also include the location indicator 407 described above.

Additionally, the instruction pane 501 may contain an activity pane 507 describing the current activity of the resource manager application 221. The activity pane 507 may contain an expectation area 511, as well as potentially a details region 514 through which the technician 108 may request further details about the expected components 104. The activity pane 507 may further contain an observation area 517. In this example, the expectation area 511 indicates that 15 devices are expected to be installed within the rack, and the observation area 517 indicates that the device discovery operation in presently underway. Device discovery may correspond to the operations performed during establishment of communication sessions and authenticating the components 104.

Figure 6:
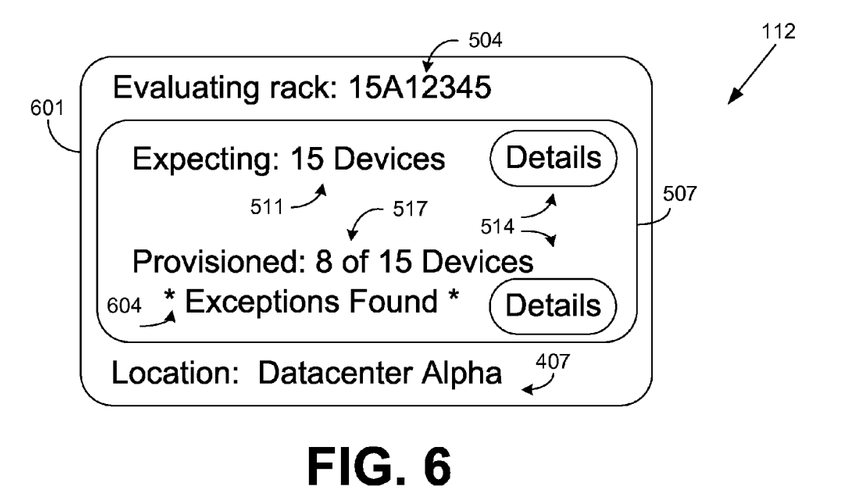

FIG. 6 shows an example instruction pane 601 that might be used after a technician 108 has begun scanning the components of the equipment rack, and configuration data from some of the components has been obtained. The instruction pane 601 may again include the status area 504 indicating the component assembly being validated. The instruction pane 601 may also include the location indicator 407 described above.

Additionally, the instruction pane 601 may again contain the activity pane 507 describing the current activity of the resource manager application 221. The activity pane 507 may again contain an expectation area 511, as well as potentially a details region 514 through which the technician 108 may request further details about the expected components 104. The activity pane 507 may further contain an observation area 517. In this example, the observation area 517 indicates that so far 8 of 15 devices expected to be provisioned within the rack have been in fact been provisioned. The exception area 604 may be used to indicate any discrepancies found with the devices discovered thus far. In this example, the exception area 604 displays the message "Exceptions Found" and provides another details region 514 by which a technician 108 may obtain further information about the exception(s).

Figure 7:
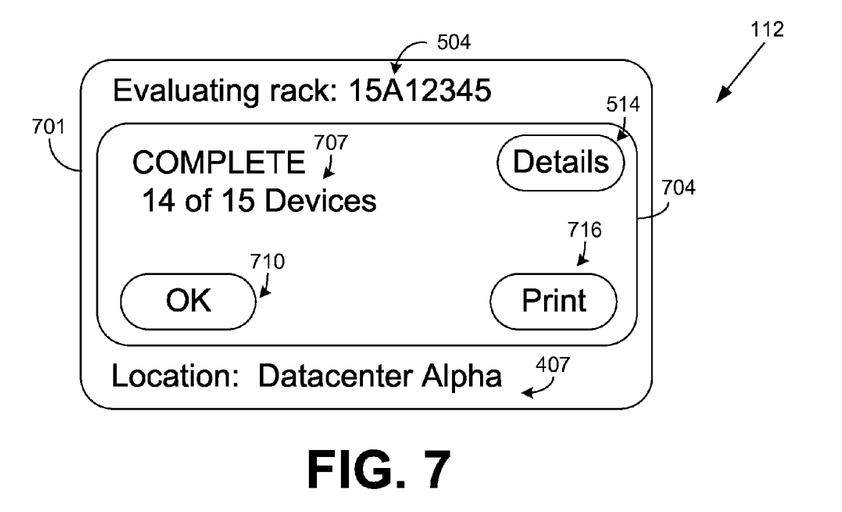

FIG. 7 shows an example instruction pane 701 that might be used after the resource manager application 221 has provisioned all of the expected components 104, upon a timeout event associated with carrying out the provisioning, or upon the occurrence of other possible events. The instruction pane 701 may again include the status area 504 indicating the component assembly being provisioned, as well as the location indicator 407.

The instruction pane 701 may contain the response pane 704 describing the response to be taken based upon the discrepancies discovered with the components 104. The response pane 704 may contain a response message area 707, as well as potentially a details region 514 through which the technician 108 may request further details about the response. In this example, the response message area 707 indicates provisioning of the components of this rack has completed and that 14 of 15 of the expected components 104 were provisioned. The response pane 704 may also contain a confirmation region 710 through which a technician may confirm the response to be taken for the component assembly. In some embodiments, the response pane 704 may contain a print region 716 through which a technician 108 may print a report of the results and/or discrepancies as determined by the resource manager application 221. The report may be printed by a printing device integrated within or attached to the computing device 110, or by a remote printing device accessible via a network.

Figure 8:
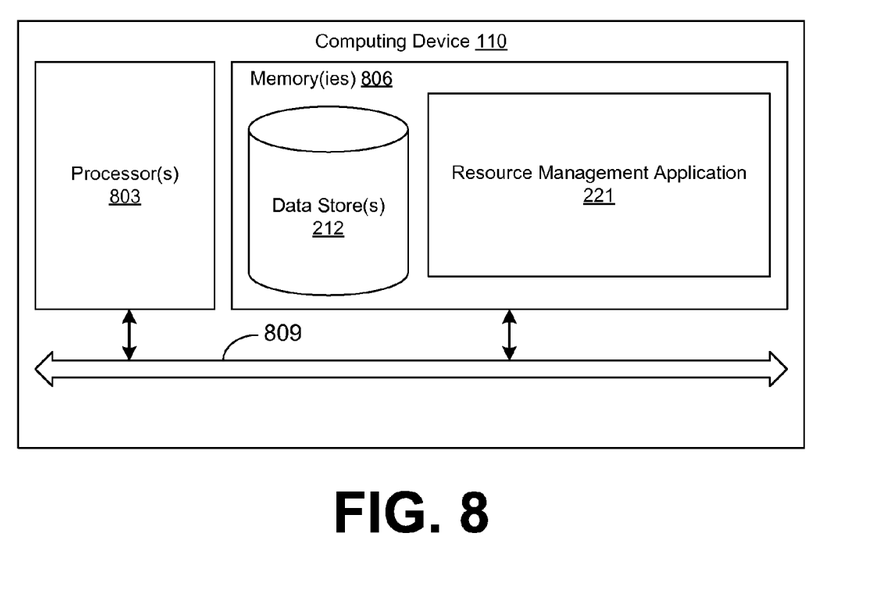
FIG. 8 is a schematic block diagram that provides one example illustration of a computing device employed in the networked environment of FIGS. 2A and 2B according to various embodiments of the present disclosure.

With reference to FIG. 8, shown is a schematic block diagram of the computing device 110 according to an embodiment of the present disclosure. The computing device 110 includes at least one processor circuit, for example, having a processor 803 and a memory 806, both of which are coupled to a local interface 809. To this end, each computing device 110 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the resource manager application 221, and potentially other applications. Also stored in the memory 806 may be a data store 212 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and/or multiple processor cores and the memory 806 may represent multiple memories 806 that operate in parallel processing circuits, respectively. In such a case, the local interface 809 may be an appropriate network that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the resource manager application 221, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 3 shows the functionality and operation of an implementation of portions of the resource manager application 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource manager application 221, that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program, that when executed by a computing device, causes the computing device to at least:
   receive data comprising a user interface, a portion of the data being supplied by a resource management system, the resource management system comprising configuration data associated with a cryptographic module of a target computing device;
   determine whether a data communication interface communicably coupled to the target computing device corresponds to a local communication bus of the computing device, the local communication bus corresponding to a dedicated external port of the target computing device;
   if the data communication interface does not correspond to the local communication bus of the computing device:
      obtain, via the data communication interface, an authentication credential for the cryptographic module of the target computing device, the authentication credential comprising a key assigned to the cryptographic module; and
      transmit, via the data communication interface, the configuration data for the cryptographic module of the target computing device, the configuration data being encrypted based at least in part on the authentication credential; and
   if the data communication interface corresponds to the local communication bus of the computing device, transmit, via the data communication interface, the configuration data for the cryptographic module of the target computing device, the configuration data secured by a physical presence of the computing device; and
   obtain data encoding a configuration response in the user interface, the configuration response indicating at least one result of the configuration data being applied to the cryptographic module of the target computing device.

2. The non-transitory computer-readable medium of claim 1, wherein the program is executable in a virtual machine, the virtual machine executable in the computing device.

3. The non-transitory computer-readable medium of claim 1, wherein the dedicated external port has exclusive access to the local communication bus.

4. The non-transitory computer-readable medium of claim 1, wherein the local communication bus comprises at least one of: a universal serial bus or a Thunderbolt interface.

5. A first computing device, comprising:
   a processor circuit having at least one processor and a memory; and
   a data communication interface communicably coupled to the processor circuit, the processor circuit being configured to at least:
      acquire configuration data for a cryptographic module, wherein the configuration data is acquired from a resource management system, the resource management system storing configuration data for a plurality of computing devices;
      determine whether the data communication interface corresponds to a local communication interface, the local communication interface corresponding to a dedicated external port of the cryptographic module;
      if the data communication interface does not correspond to the local communication interface:
         obtain an authentication credential for a second computing device, the second computing device being present in a data center environment and comprising the cryptographic module; and
         transmit, via the data communication interface, the configuration data to the second computing device, the configuration data being encrypted based at least in part on the authentication credential; and
      if the data communication interface corresponds to the local communication interface of the processor circuit, transmit, via the data communication interface, the configuration data to the second computing device, the configuration data secured by a physical presence of the first computing device.

6. The first computing device of claim 5, further comprising a virtual machine executable by the at least one processor, the resource management system being executable by the virtual machine.

7. The first computing device of claim 6, wherein the virtual machine is replaced according to a schedule.

8. The first computing device of claim 5, wherein the cryptographic module is a Trusted Platform Module (TPM).

9. The first computing device of claim 5, wherein the configuration data comprises a digital certificate.

10. The first computing device of claim 5, wherein the processor circuit is further configured to obtain a configuration response from the second computing device, the configuration response indicating at least one result of the configuration data being applied to the cryptographic module.

11. The first computing device of claim 10, wherein the processor circuit is further configured to generate an exception based at least in part upon the configuration response indicating an error in the configuration response.

12. The first computing device of claim 5, wherein the processor circuit is further configured to initiate a replacement of executable code stored in the second computing device, the executable code being associated with the cryptographic module, and the replacement occurring prior to transmitting the configuration data.

13. The first computing device of claim 5, wherein the local communication interface comprises at least one of: a local communication bus, a baseboard management controller, a serial console, a network that is physically isolated from other networks, or a network that is logically isolated from the other networks.

14. A method, comprising:
   determining, in a first computing device, whether a data communication interface corresponds to a local communication interface of the first computing device, the local communication interface corresponding to a dedicated external port of the first computing device;
   in response to determining that the data communication interface does not correspond to the local communication interface of the first computing device, obtaining, in the first computing device, an authentication credential for a cryptographic module of a second computing device, the authentication credential obtained via a communication session with a module interface of the second computing device, the communication session occurring via the data communication interface, the communication session being encrypted based at least in part on the authentication credential;

in response to determining that the data communication interface does correspond to the local communication interface of the first computing device, securing the communication session based at least in part on a physical presence of the local communication interface of the first computing device;

determining, in the first computing device, configuration data for the cryptographic module, wherein the configuration data is acquired, via a network interface of the first computing device, from a resource management system, the resource management system storing configuration data for a plurality of computing devices; and transmitting, in the first computing device, the configuration data to the second computing device.

15. The method of claim 14, further comprising transmitting, via the network interface of the first computing device, an update to the resource management system, the update associated with a delivery of the configuration data to the second computing device.

16. The method of claim 14, wherein the network interface is a wireless network interface.

17. The method of claim 14, wherein the configuration data is acquired via a secured communication session between the first computing device and the resource management system, the secured communication session being encrypted.

18. The method of claim 14, wherein the cryptographic module is a trusted platform module (TPM).

19. The method of claim 18, wherein the configuration data comprises an option to enable remote attestation.

20. The method of claim 14, wherein the second computing device is one of the plurality of computing devices of a component assembly.

21. The method of claim 14, wherein the configuration data further comprises a secret key.

22. The method of claim 14, further comprising obtaining, via the data communication interface of the first computing device, a configuration request from the second computing device, the configuration request indicating a presence of the cryptographic module in the second computing device.

23. The method of claim 22, wherein the configuration request complies with a preboot execution environment (PXE) protocol.

24. The method of claim 14, further comprising: authenticating, in the first computing device, a second authentication credential with the module interface of the second computing device via the communication session, the second authentication credential corresponding to the first computing device.

* * * * *